United States Patent
Nannen et al.

(10) Patent No.: US 11,456,683 B2
(45) Date of Patent: Sep. 27, 2022

(54) METHOD FOR A NETWORK SYNCHRONIZATION OF A PERMANENTLY EXCITED THREE-PHASE MACHINE COMPRISING A SOFT STARTER WHICH COMPRISES THYRISTORS

(71) Applicant: Siemens Aktiengesellschaft, Munich (DE)

(72) Inventors: Hauke Nannen, Nuremberg (DE); Heiko Zatocil, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/296,609

(22) PCT Filed: Nov. 25, 2019

(86) PCT No.: PCT/EP2019/082384
§ 371 (c)(1),
(2) Date: May 25, 2021

(87) PCT Pub. No.: WO2020/114816
PCT Pub. Date: Jun. 11, 2020

(65) Prior Publication Data
US 2022/0006400 A1    Jan. 6, 2022

(30) Foreign Application Priority Data
Dec. 6, 2018  (EP) .................................. 18210695

(51) Int. Cl.
*H02P 1/46*       (2006.01)
*H02P 25/022*    (2016.01)
*H02P 25/22*     (2006.01)

(52) U.S. Cl.
CPC ............... *H02P 1/46* (2013.01); *H02P 25/22* (2013.01)

(58) Field of Classification Search
CPC ........... H02P 1/46; H02P 25/022; H02P 27/16
See application file for complete search history.

(56) References Cited

U.S. PATENT DOCUMENTS

| 6,051,893    | A  | * | 4/2000 | Yamamoto | ................ | H02J 9/06 307/64 |
| 2014/0184118 | A1 | * | 7/2014 | Familiant | .............. | H02M 5/293 318/400.26 |

(Continued)

FOREIGN PATENT DOCUMENTS

| DE | 102016204837 A1 | 9/2017 |
| DE | 102016214419 A1 | 2/2018 |
| EP | 1677323 A1      | 7/2006 |

OTHER PUBLICATIONS

PCT International Search Report and Written Opinion of International Searching Authority dated Mar. 4, 2020 corresponding to PCT International Application No. PCT/EP2019/082384 filed Nov. 25, 2019.

(Continued)

*Primary Examiner* — Bickey Dhakal
(74) *Attorney, Agent, or Firm* — Harness, Dickey & Pierce, P.L.C.

(57) ABSTRACT

A method is for a network synchronization of a permanently excited three-phase machine including a soft starter, including thyristors, and mechanical bypass contacts for bridging the thyristors in the network operation. The method includes generating a first control signal, to initiate switching the mechanical bypass contacts to become conductive, after a criterion is reached while running up the three-phase machine on the soft starter, a time at which the first control signal is generated representing actuation time of the bypass (Continued)

contacts; generating ignition pulses for the thyristors within a time period, running from the actuation time to a contact time of the bypass contacts, using a second control signal; and operating the three-phase machine in the network operation via the bypass contacts. Each ignition pulse for a thyristor is generated when a phase current measurement indicates that the current strength in the assigned phase has fallen below a threshold value.

16 Claims, 4 Drawing Sheets

(56) References Cited

U.S. PATENT DOCUMENTS

| | | |
|---|---|---|
| 2015/0180377 A1 | 6/2015 | Hua et al. |
| 2016/0268933 A1* | 9/2016 | Kim .................. H02P 1/04 |
| 2019/0190407 A1 | 6/2019 | Lee-Hoff et al. |

OTHER PUBLICATIONS

Dr. Marcel Benecke (Otto-von-Guericke-Universität Magdeburg, 2012) entitled "Anlauf von energieeffizienten Synchronmaschinen mit Drehstromsteller.".

* cited by examiner

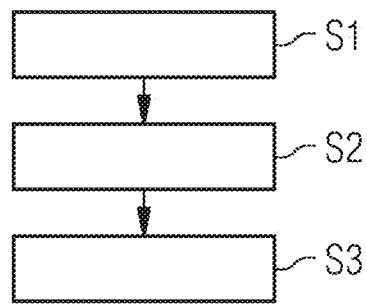
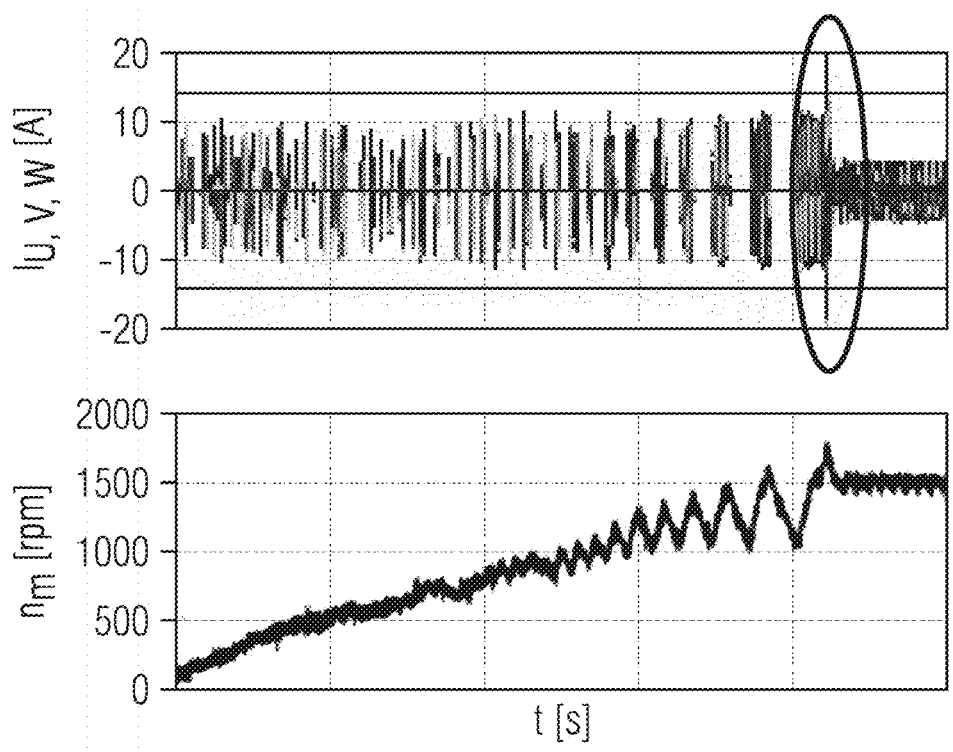

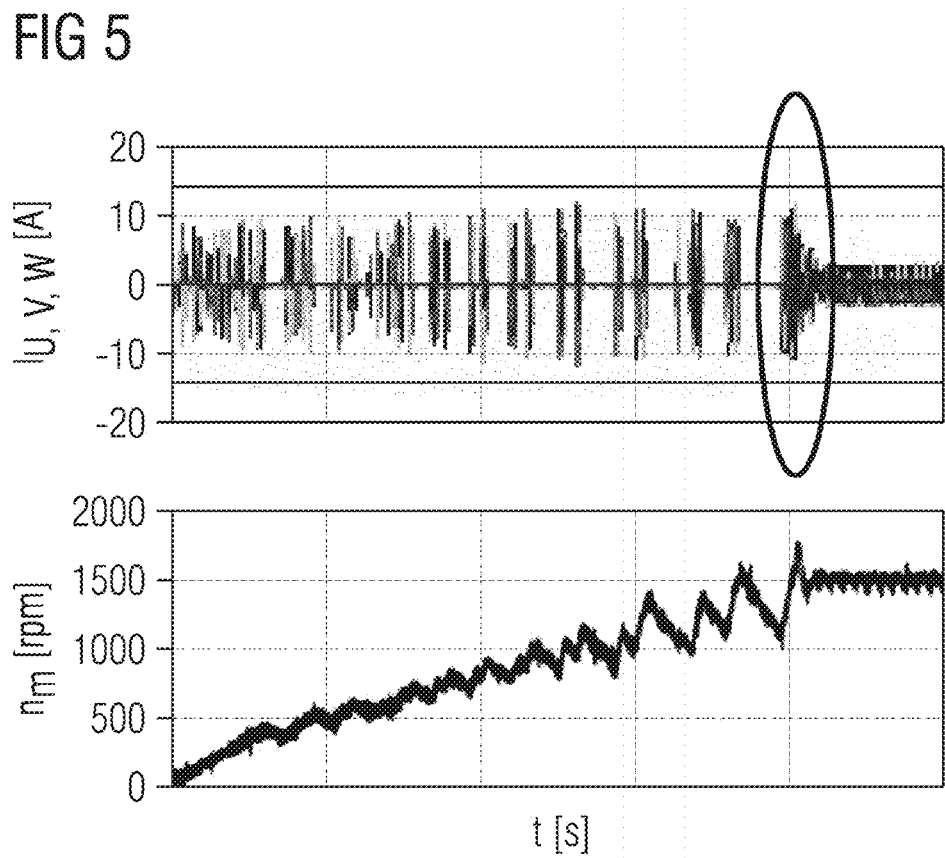

METHOD FOR A NETWORK SYNCHRONIZATION OF A PERMANENTLY EXCITED THREE-PHASE MACHINE COMPRISING A SOFT STARTER WHICH COMPRISES THYRISTORS

PRIORITY STATEMENT

This application is the national phase under 35 U.S.C. § 371 of PCT International Application No. PCT/EP2019/082384 which has an International filing date of Nov. 25, 2019, which claims priority to European application number 18210695.5 filed Dec. 6, 2018, the entire contents of each of which are hereby incorporated herein by reference.

FIELD

The disclosure generally relates to the field of three-phase magnets.

BACKGROUND ART

A three-phase machine converts mechanical energy into three-phase current or three-phase current into mechanical energy. In principle, it can be operated as an electric generator or as an electric motor. Soft-starting refers to measures for power limitation when an electrical device, for example an electric motor, is switched on.

In accordance with IEC standard 60034, three-phase machines are categorized into different energy efficiency classes on the basis of their efficiency. Precisely in the lower power range up to approximately 20 kW, the legal efficiencies for electric drives can be adhered to only with difficulty, for which reason the use of permanent magnets in the rotor is increasingly sought, for example as a permanent-magnet synchronous machine (PMSM).

FIG. 1 shows a schematic illustration of such a permanent-magnet synchronous machine M in the embodiment as a revolving-field machine having a stator St and a rotor L. The rotor comprises a magnetic north pole N and south pole S. The stator St comprises winding phases U, V, W. The illustration should merely be understood by way of example and does not have any restrictive effect in respect of the scope of protection of the claimed subject matter.

This type of machine does enable high degrees of energy efficiency, but starting and operation on a stiff grid is not readily possible.

In order to enable this, a damper cage can be provided in the rotor of the machine; this damper cage does enable reliable runup on a stiff grid, but the feeding grid is subjected to very high starting currents.

Likewise, operation using a suitable power-electronics actuating element, such as, for example, a frequency converter or a soft starter, is possible. In this case, in particular the use of a soft starter (also referred to as soft-starting device) represents a cost-friendly solution for runup of a permanent-magnet synchronous machine on a stiff grid. Such a soft starter reduces the voltage during switch-on (for example by way of phase gating) and increases the voltage slowly until it reaches the full line voltage. Such a soft start is, however, often only possible in the off-load state or on a low load. At present, however, there is as yet no known market-ready solution for this.

The dissertation by Dr. Marcel Benecke (Otto-von-Guericke-Universität Magdeburg, 2012) entitled "Anlauf von energieeffizienten Synchronmaschinen mit Drehstromsteller" [Starting of energy-efficient synchronous machines having three-phase AC power controllers] proposes a solution for the runup of the permanent-magnet synchronous machine using a soft starter. The method proposed in this work uses the present angular displacement of the machine, and so the motors used for the work needed to be equipped with a corresponding encoder system. An encoder is understood to mean a speed and position encoder. The encoders detect the mechanical variables of speed and position. Their signals are necessary for supplying actual values to the controller and closing the existing position and speed control loops. For the vectorial closed-loop control methods in three-phase drives, the position and speed signals are also used as input variable for the current control loop. The encoder in this case detects the speed and/or position directly on the motor shaft.

The encoder system has a negative effect on the costs and the availability of the system, which at present makes a soft starter solution unattractive for high-efficiency motors. For these reasons, a method for runup without encoders is sought.

During operation of a permanent-magnet synchronous machine using a soft starter, speed regulation would be desirable for realizing the widest variety of applications, but it has not yet been possible for this to be implemented.

The required method differs from the encoder-less methods known from the prior art in that it needs to be usable for a thyristor controller, and not a frequency converter. Therefore, these known methods are not applicable.

DE 10 2016 204 837 A1 (Siemens AG) Sep. 28, 2017 discloses a starting method for an electric motor in which, during the determination of an actuation time for a delta switch in the form of a contactor having a bypass semiconductor path, the attraction time of the delta switch itself is taken into consideration. The actuation time substantially corresponds to the time at which a corresponding actuation command reaches the delta switch and the attraction of the delta switch starts. The actuation time is selected such that it leads the desired switching time by the duration of the attraction time. The electromechanical switching contact can be bypassed for a specific duration for the purpose of a quick and temporally precise actuation.

EP1677323A1 (Siemens AG) Jul. 5, 2006 describes a method for avoiding contact erosion in low-voltage circuit breakers having at least one controllable semiconductor switching device and at least one electromechanical switching device connected in parallel with the semiconductor switching device.

DE102016214419A1 (Siemens AG) Feb. 8, 2018 discloses a soft starter for switching at least one main current path, which in each case comprises a bypass circuit having a semiconductor switch, wherein the soft starter has a control unit for actuating the bypass circuit, and the control unit has a control signal input and a separate safety signal input.

SUMMARY

At least one embodiment of the invention specifies a method for grid synchronization of a permanent-magnet three-phase machine having a soft starter which avoids overcurrents on connection to a stiff grid. At least one embodiment of the invention furthermore specifies a permanent-magnet three-phase machine without encoders which operates using the method according to at least one embodiment of the invention.

Embodiments are directed to a method, a control apparatus and a three-phase machine. Advantageous configurations result from the claims.

At least one embodiment of the present application describes a method for grid synchronization of a permanent-magnet three-phase machine having a soft starter comprising thyristors and having mechanical bypass contacts for bypassing the thyristors during grid operation. Grid synchronization is understood to mean the time or the phase at the end of the runup of the three-phase machine during which the three-phase machine is accelerated in a targeted manner, at which a permanent connection of the phases of the three-phase machine to a power supply grid is possible and is performed.

In an embodiment, the method comprises the step of generating a first control signal, by which the switching-on of the mechanical bypass contacts is initiated, to be precise once a preset criterion has been reached during runup of the three-phase machine using the soft starter. The time of the generation of the first control signal in this case represents an actuation time of the bypass contacts. The method comprises the further step of generating firing pulses for the thyristors within a time period, which ranges from the actuation time to a contact time of the bypass contacts, by way of a second control signal, wherein a respective firing pulse for a thyristor is generated when a phase current measurement reveals that the current in the associated phase falls below a preset value. The mentioned time period is the structurally dependent time which is required for closing the mechanical bypass contacts since the actuation time (which coincides with the reception of a corresponding control command). Finally, the method comprises the step of operating the three-phase machine during grid operation via the bypass contacts. The operation of the three-phase machine via the bypass contacts takes place from the contact time since the bypass contacts are switched on from this time.

In addition, a computer program product is proposed in an embodiment, which can be loaded directly onto the internal memory of a digital computer and comprises software code segments with which the steps of an embodiment of the method described herein are executed when the product is running on the computer. The computer program product can be embodied in the form of a data carrier, for example a DVD, a CD-ROM, a USB memory stick or the like (DVD=digital versatile disc; CD-ROM=compact disc read-only memory; a USB=universal serial bus). Likewise, the computer program product can be present in the form of a signal which can be loaded via a wired or wireless network.

In addition, a control apparatus for a three-phase machine having a soft starter comprising thyristors and having mechanical bypass contacts for bypassing the thyristors during grid operation is proposed. The control apparatus is characterized by the fact that it is designed to implement an embodiment of the method described herein. This is associated with the same advantages as have been described in connection with the method according to the invention.

In an embodiment, the control apparatus is designed to generate a first control signal, by which the switching-on of the mechanical bypass contacts is initiated, once a preset criterion has been reached during runup of the three-phase machine using the soft starter, wherein the time of the generation of the first control signal represents an actuation time of the bypass contacts. For this purpose, the control apparatus can be connected to a sensor, for example a tachometer, from which the control apparatus receives sensor values, for example speed values, for example with the unit rpm (=revolutions per minute) or 1/s, relating to the present speed of the three-phase machine. The control apparatus compares, in particular in an arithmetic and logic unit, for example a digital computer, processor or ASIC, the received sensor values with a preset criterion, for example a target speed, which is stored in a memory of the control apparatus, and generates the first control signal as soon as the preset criterion is reached during runup of the three-phase machine, for example as soon as the speed of the three-phase machine has reached a preset target speed (ASIC=application-specific integrated circuit). In this case, the transmission of the first control signal from the control apparatus to the soft starter can take place via a signal line.

Furthermore, a three-phase machine having a soft starter comprising thyristors and having mechanical bypass contacts for bypassing the thyristors during grid operation is proposed in an embodiment. The three-phase machine is designed to implement an embodiment of the method described herein, as a result of which grid synchronization of the permanent-magnet three-phase machine with respect to a power supply grid is made possible.

BRIEF DESCRIPTION OF THE DRAWINGS

The invention will be explained in more detail below with reference to embodiments including the figures:

FIG. 3 shows a flowchart of the method according to an embodiment of the invention;

FIGS. 4 and 5 show time characteristics of the speed and the phase currents of two different measurements of a grid synchronization.

DETAILED DESCRIPTION OF THE EXAMPLE EMBODIMENTS

Figure 1:
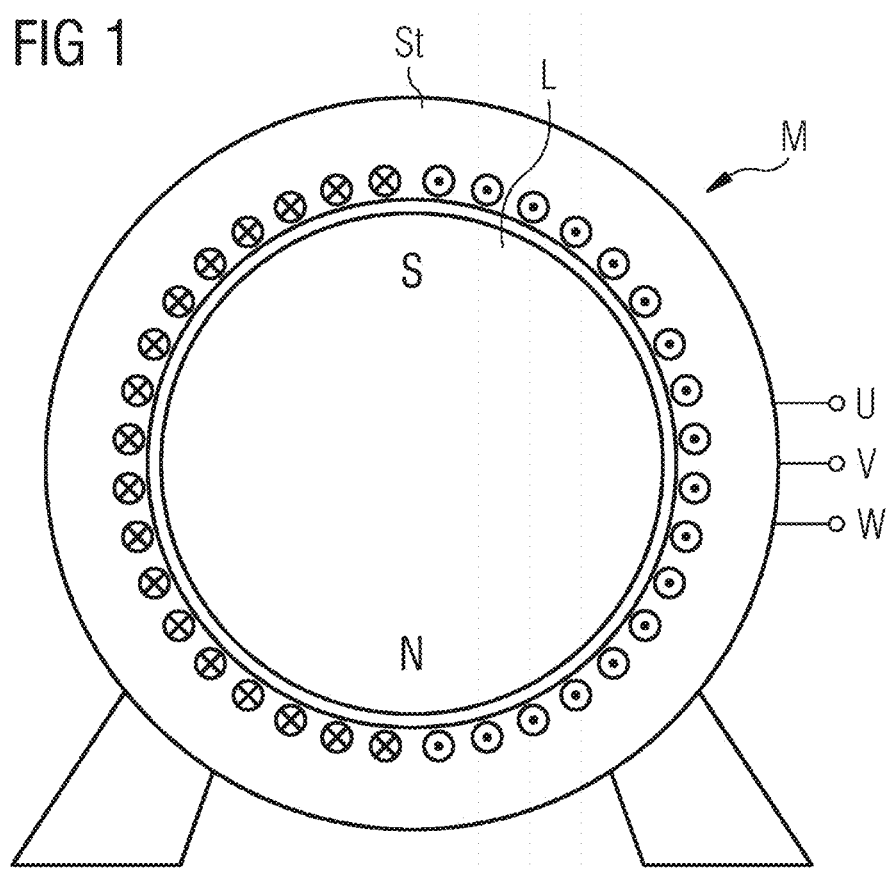
FIG. 1 shows a section through an example three-phase machine.

At least one embodiment of the present application describes a method for grid synchronization of a permanent-magnet three-phase machine having a soft starter comprising thyristors and having mechanical bypass contacts for bypassing the thyristors during grid operation. Grid synchronization is understood to mean the time or the phase at the end of the runup of the three-phase machine during which the three-phase machine is accelerated in a targeted manner, at which a permanent connection of the phases of the three-phase machine to a power supply grid is possible and is performed.

The method comprises the step of generating a first control signal, by which the switching-on of the mechanical bypass contacts is initiated, to be precise once a preset criterion has been reached during runup of the three-phase machine using the soft starter. The time of the generation of the first control signal in this case represents an actuation time of the bypass contacts. The method comprises the further step of generating firing pulses for the thyristors within a time period, which ranges from the actuation time to a contact time of the bypass contacts, by way of a second control signal, wherein a respective firing pulse for a thyristor is generated when a phase current measurement reveals that the current in the associated phase falls below a preset value. The mentioned time period is the structurally dependent time which is required for closing the mechanical bypass contacts since the actuation time (which coincides with the reception of a corresponding control command). Finally, the method comprises the step of operating the three-phase machine during grid operation via the bypass contacts. The operation of the three-phase machine via the bypass contacts takes place from the contact time since the bypass contacts are switched on from this time.

The proposed method makes it possible to synchronize a permanent-magnet three-phase machine, which is accelerated by way of a soft starter, with the grid without overcurrent events or oscillations in the drive train occurring. In particular, the method makes it possible to take into consideration a differential angle between the grid angle and the rotor angle by virtue of them being operated by the parallel operation of the bypass contacts and the thyristors during the switch-on operation of the bypass contacts. As soon as the bypass contacts are on, the thyristors are self-extinguished, with the result that the three-phase machine is operated during grid operation merely via the bypass contacts. The parallel operation of the two switching elements avoids the undesired oscillations of the drive train and prevents the likewise undesired overcurrents.

The preset criterion which results in the generation of the first control signal in particular comprises that a speed of the three-phase machine has reached a target speed for the torque machine which is in a predefined speed corridor. As a result, it can be ensured that, by virtue of the closing of the bypass contacts, oscillations of the drive train and high overcurrents are prevented, wherein once the bypass contacts have closed, the starting operation and therefore the grid synchronization of the permanent-magnet three-phase machine is concluded.

In particular, provision can be made for the target speed to be slightly higher or lower than the grid speed. This ensures that the angle of the grid changes sufficiently quickly so that an angle condition for grid synchronization of the permanent-magnet synchronous machine is met in good time. If the target speed were to be selected to be exactly identical to the grid speed, it would be possible for it to take a long time for a rotation angle condition to be met or for it not to be met at all since the grid angle and the motor angle in this state follow with the same spacing and therefore the differential angle remains virtually unchanged.

A further configuration envisages that the preset criterion comprises that the differential angle, which results from the difference between the grid angle and the rotor angle, comes to lie in a predefined differential angle corridor. If both the differential angle and the motor speed each lie in their respectively defined target corridor, the permanent-magnet three-phase machine can be synchronized with the grid without any severe oscillations in the drive train or without maximum current values being exceeded. The values, both for the target corridor of the speed and for the target corridor of the angle, can be learned during the operation of the three-phase machine and during a multiplicity of runups, respectively. As a result, it is possible to operate different combinations of three-phase machines and soft starters with one another. The values "learned" in the process for the differential angle and the motor speed can be stored in a memory, with the result that the already learned values can continue to be used for similar combinations.

A further expedient configuration envisages that the preset criterion comprises that an absolute value of a total flux, which results from the addition of a flux generated by the permanent magnets and a flux generated by a damper cage, exceeds a preset minimum flux value, wherein the absolute value of the total flux is determined from the measured motor voltages. By virtue of the geometric addition of the fluxes, there may be times at which the machine fluxes are in opposite directions, and the resultant total flux is considerably less than the flux generated by the permanent magnets. Even if, at this time, the differential angle and the speed were to lie in a suitable constellation, an overcurrent event may arise since the back-EMF of the three-phase machine would be too low in comparison with the line voltage and therefore a high current would occur (EMF=electromotive force). Accordingly, it is expedient to additionally adhere to a minimum value for the absolute value of the total flux which can be determined by measurement of the motor voltages.

In a further configuration, the contact time of the bypass contacts may be a time, determined using measurement technology, at which the bypass contacts are on, for example as a result of a measurement of the voltage drop across the bypass. In this case, the output of a control signal for generating a firing pulse for the thyristors can cease. A further possibility for determining the contact time of the bypass contacts would be to detect a contact position of a movable contact of the bypass, for example by way of an auxiliary contact. Alternatively, the contact time may be a time duration, determined by tests, since the actuation time, in particular plus a safety margin. As a result, it is not necessary to determine the time period, which ranges from the actuation time to the contact time of the bypass contacts, using measurement technology, but rather the time period can be established in advance, on the basis of empirical values. By virtue of the provision of a sufficient safety margin, in this case it can always be ensured that the bypass contacts are switched on before driving of the thyristors ceases.

In addition, a computer program product is proposed in an embodiment, which can be loaded directly onto the internal memory of a digital computer and comprises software code segments with which the steps of an embodiment of the method described herein are executed when the product is running on the computer. The computer program product can be embodied in the form of a data carrier, for example a DVD, a CD-ROM, a USB memory stick or the like (DVD=digital versatile disc; CD-ROM=compact disc read-only memory; a USB=universal serial bus). Likewise, the computer program product can be present in the form of a signal which can be loaded via a wired or wireless network.

In addition, a control apparatus for a three-phase machine having a soft starter comprising thyristors and having mechanical bypass contacts for bypassing the thyristors during grid operation is proposed. The control apparatus is characterized by the fact that it is designed to implement an embodiment of the method described herein. This is associated with the same advantages as have been described in connection with the method according to the invention.

In an embodiment, the control apparatus is designed to generate a first control signal, by which the switching-on of the mechanical bypass contacts is initiated, once a preset criterion has been reached during runup of the three-phase machine using the soft starter, wherein the time of the generation of the first control signal represents an actuation time of the bypass contacts. For this purpose, the control apparatus can be connected to a sensor, for example a tachometer, from which the control apparatus receives sensor values, for example speed values, for example with the unit rpm (=revolutions per minute) or 1/s, relating to the present speed of the three-phase machine. The control apparatus compares, in particular in an arithmetic and logic unit, for example a digital computer, processor or ASIC, the received sensor values with a preset criterion, for example a target speed, which is stored in a memory of the control apparatus, and generates the first control signal as soon as the preset criterion is reached during runup of the three-phase machine, for example as soon as the speed of the three-phase machine has reached a preset target speed (ASIC=application-specific integrated circuit). In this case, the transmission of the first control signal from the control apparatus to the soft starter can take place via a signal line.

The control apparatus is furthermore designed to generate firing pulses for the thyristors within a time period, which ranges from the actuation time to a contact time of the bypass contacts, by way of a second control signal, wherein a respective firing pulse for a thyristor is generated when a phase current measurement reveals that the current in the associated phase falls below a preset value. For this purpose, the control apparatus can be connected to a current sensor, for example a phase-current ammeter arranged in the soft starter, from which the control apparatus receives sensor values, for example measured values relating to the present current intensity in a phase. The control apparatus compares the received sensor values with a preset value which is stored in a memory of the control apparatus and generates the second control signal if the current intensity in the associated phase falls below a preset value. In this case, the transmission of the second control signal from the control apparatus to the soft starter can take place via a signal line.

In addition, the control apparatus is furthermore designed to operate the three-phase machine during grid operation via the bypass contacts. In this case, the transmission of the control signals from the control apparatus to the soft starter can take place via a signal line.

Furthermore, a three-phase machine having a soft starter comprising thyristors and having mechanical bypass contacts for bypassing the thyristors during grid operation is proposed in an embodiment. The three-phase machine is designed to implement an embodiment of the method described herein, as a result of which grid synchronization of the permanent-magnet three-phase machine with respect to a power supply grid is made possible.

Figure 2:
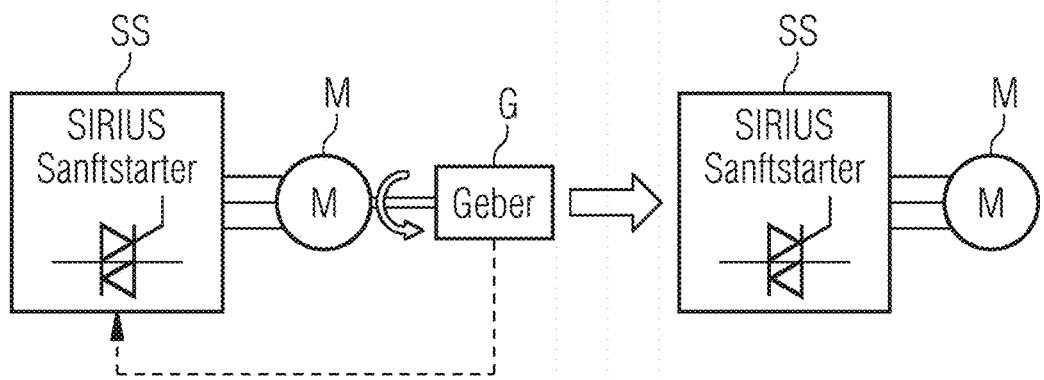
FIG. 2 shows a schematic illustration of the design according to an embodiment of the invention.

FIG. 2 shows the basic desired design of the three-phase machine M, which is in the form of a permanent-magnet synchronous machine, having a soft starter SS (for example a Sirius soft starter) without an encoder (on the right), in contrast to a three-phase machine M having a soft starter SS (for example a Sirius soft starter) and having an encoder G connected to the three-phase machine M (on the left). As described at the outset, the three-phase machine may be, for example, in the form of a revolving-field machine having a stator St and a rotor L. The rotor L comprises a magnetic north pole N and south pole S. The stator St comprises winding phases U, V, W. The rotor L can be connected, for example in rotationally fixed fashion (or via a gear mechanism), to a shaft (not illustrated), which is subjected to an external load with an in particular constant torque.

With the aid of the method proposed by the Applicant in WO 2018/086688 A1 (Siemens AG) May 17, 2018, the entire contents of which are hereby incorporated herein by reference, a calculation of firing times of the thyristors of the soft starter SS takes place, as a result of which an encoder can be dispensed with. The encoder-less starting method is based on the consideration that, when the thyristors are fired for the first time, the three-phase machine (also: the motor) is accelerated with the maximum possible torque. This is intended to ensure that the motor, after initial firing, has already exceeded a certain minimum speed, and therefore the induced voltages can be measured sufficiently accurately during the principle-related off time of the thyristors. Then, in accordance with the so-called EMF methods already known, the electrical angle of the motor can be determined from the induced voltages and used for the Benecke method (from the above-cited dissertation). In addition, during a two-phase firing, the voltage of the third phase can be measured directly and taken into consideration in the evaluation.

Since motors using soft-starting devices, also referred to as soft starters, usually drive passive loads with linear or square load characteristics, the torque is used in the initial firing virtually completely for accelerating the sluggish mass. To this extent, it can be assumed that the acceleration during the initial firing is sufficient and the induced voltages can be measured with sufficient accuracy. During the measurement of the voltages, use can be made of the measurement sensor system which is present in any case in the soft starter. The method therefore does not require any additional hardware.

The encoder-less starting method comprises two steps.

Step 1: Determination of the Optimal Firing Angle:

Once the method for the initial alignment of the machine has been completed, the present angle of the motor is known. On the basis of this known starting angle, in accordance with the abovementioned method that firing angle of the soft starter at which the torque generated in the motor is at a maximum for a given maximum current can be calculated. In order to develop as high a torque as possible during the initial firing of the thyristors, the maximum permissible current during the initial firing is set to the maximum permissible current for the power semiconductors.

During the calculation of the optimum firing angle, in general the characteristic of the rotation angle and the speed is also taken into consideration during the firing of the thyristors, but these are not known in the calculation of the firing angle. For this reason, the optimum firing angle for the initial firing should be determined in advance as part of a setup method for the drive.

Step 2: Switchover to EMF Method:

Once the permanent-magnet synchronous machine has been accelerated by the initial firing, the voltages induced by the rotation of the machine are sufficiently high to be able to be measured during the off phase of the thyristors. Then, for example by way of an observer or by way of a simple arc tangent calculation, the flux angle of the machine can be determined from the measured voltages. Likewise, it is conceivable to determine the rotation angle purely on the basis of the exciting voltages, the measured currents and the machine equations, i.e. with the aid of a calculation specification.

Independently of the selected approach, in the mentioned cases numerous methods are already known from the field of encoder-less regulation and use can be made of these methods. The flux angle determined from the EMF method is used for the Benecke method as actual value, and from this the next optimum firing angle during rotation of the machine is determined.

With the abovementioned method, the motor M is accelerated in a targeted manner. The soft starter SS has, in addition to the thyristors which are used for the acceleration, bypass elements (not illustrated in any more detail), which are used for bypassing the thyristors on completion of the motor starting for grid synchronization. The bypass elements represent electromechanical switching elements, for example a grid contactor or a relay. Using these bypass elements, the motor M is then fixedly connected to the grid, as a result of which the starting operation is finally concluded. In the case of an asynchronous machine, this operation can be realized in a simple manner: if a preset target speed has been reached, the bypass elements can be closed, and the starting operation is concluded. The asynchronous machine does not experience any overcurrent events or oscillations in the drive train. In the case of the permanent-magnet three-phase machine, it is expediently also necessary to take into consideration at least the differential angle between the grid angle and the rotor angle in order to prevent severe oscillations of the drive train and large overcurrents. The procedure selected here is described below.

The bypass elements are mechanical switching elements which require a structurally related time to be closed. The time span between activation and actual closure (i.e. switching-on) of the contacts is a few milliseconds and is referred to as the delay time. This means that approximately one or more grid periods pass until the response to the demand for closure in the form of reception of a first control signal occurs. Since in this time the speed and the differential angle can already have changed markedly, this delay for targeted connection is not acceptable. In order to bypass the delay time, the thyristors of the soft starter are used together with the phase current measurement. If the connection command takes place (as a consequence of the reception of the first control signal), the activation of the thyristors of the soft starter takes place in such a way that a respective thyristor of the soft starter SS receives a series of firing pulses whenever the absolute value of the current in the respective phase falls below a defined value. The output of the firing pulses only ends when a current value is determined at which closure of the bypass contacts can be considered to be safe. This can be established either using measurement technology or by way of a predetermined time, optionally by consideration of a safety margin. During the parallel operation of the thyristors and the bypass elements, the thyristors are fired virtually permanently, which, in terms of behavior, comes close to a closed bypass element. Once the closure of the bypass elements is ensured, the thyristors are no longer fired. This procedure enables connection to the grid in fact without a delay for the motor M and forms the basis for the targeted grid synchronization of the motor M.

In order that the motor M can be connected to the power supply grid without this resulting in severe oscillations in the drive train or in current maximum values being exceeded, the differential angle and the motor speed should each lie within a target corridor. The values, both for the target corridor for the speed and for the target corridor for the differential angle, can be generated in a variety of ways. Ideal is as small an angle as possible between the rotor angle and the grid angle, wherein the differential angle is a consequence of the loading of the rotor of the motor.

Firstly, the soft starter SS can connect independently at any desired time and establish retrospectively, via internal current measurements, whether the time of the connection is a suitable connection time for the motor. As a result of the connection given different angle/speed constellations, an overview is therefore produced of possible combinations from which it is possible to derive a corridor for the differential angle and the motor speed in which preset limits are adhered to. Since, owing to this iterative process, limit values are also exceeded more often, an algorithm requires a time of "learning" until it operates reliably. The result can be improved by virtue of the fact that, in principle, unsuitable combinations can be ruled out from the beginning. Another possibility consists in performing simulations for a connected motor type from which corridors for the rotation angle and the speed are derived. These derived parameters can then be selected in an associated soft starter or can be communicated to the soft starter retrospectively via a cloud service, for example. This enables retrospective provision of sets of parameters, depending on customer requirements and combinations of motor type and soft starter.

For safe grid synchronization, the selection of a suitable speed value needs to be taken into consideration. In contrast to the soft starter SS for asynchronous machines, expediently the grid speed is not selected here as target value, but a speed which is slightly higher or slightly lower than the grid speed. This ensures that the angle of the grid changes sufficiently quickly so that the angle condition for the connection of the motor is met in good time. If the speed is selected to be precisely identical to the grid speed, it may arise that it takes a long time for the rotation angle condition to be met or the rotation angle condition is not met at all since the grid angle and the motor angle follow with the same spacing in this state and therefore the differential angle remains virtually unchanged.

The properties of the permanent-magnet three-phase machine with a damper cage result in a further condition which needs to be taken into consideration. In the case of a motor with a damper cage, the flux generated by the permanent magnets and the flux generated by the damper cage are added to one another geometrically. As a result of the geometric addition of the fluxes, there may be times at which the machine fluxes are directed in opposite directions and the resultant total flux is significantly smaller than the flux generated by the permanent magnets. Even if at this time the differential angle and the speed were to lie in a perfect constellation, this would result in an overcurrent event since the back-EMF of the motor would be too low in comparison with the line voltage and therefore a high current value would occur. Accordingly, in addition a minimum value for the absolute value of the total flux needs to be adhered to, which can be determined by measurement of the motor voltages.

FIG. 3 shows a flowchart of the method according to an embodiment of the invention. In step S1, a first control signal is generated, by which the switching-on of the mechanical bypass contacts is initiated, to be precise once a preset criterion has been reached during runup of the three-phase machine using the soft starter, wherein the time of the generation of the first control signal represents an actuation time of the bypass contacts. The first criterion comprises a speed of the three-phase machine and/or a differential angle and/or an absolute value of the total flux, which results from the addition of a flux generated by the permanent magnets and a flux generated by a damper cage. In step S2, the generation of firing pulses for the thyristors takes place within a time period, which ranges from the actuation time to a contact time of the bypass contacts, by way of a second control signal, wherein a respective firing pulse for a thyristor is generated when a phase current measurement reveals that the current in the associated phase falls below a preset value. In step S3, an operation of the three-phase machine during grid operation via the bypass contacts takes place once the time period is concluded.

FIGS. 4 and 5 show time characteristics of the speed nm of the three-phase machine M and the phase currents IU,V,W of the three phases U, V, W during the runup operation and the grid synchronization. In this case, FIG. 4 shows the connection behavior in accordance with the prior art in which an overcurrent occurs, wherein this time occurs shortly before a target speed of nm≈1500 rpm is reached. In the I/t graph, the time of the grid synchronization and the occurrence of the overcurrent is visualized by an electrical marking. In contrast to this, it can readily be seen from the graphs in FIG. 5 that, in the case of the grid synchronization with the aid of the method according to the invention, when the target speed (nm≈1500 rpm) is reached, the phase currents do not have any overshoots during the grid synchronization. The corresponding part in the I/t graph is again marked by an ellipse.

Figure 6:
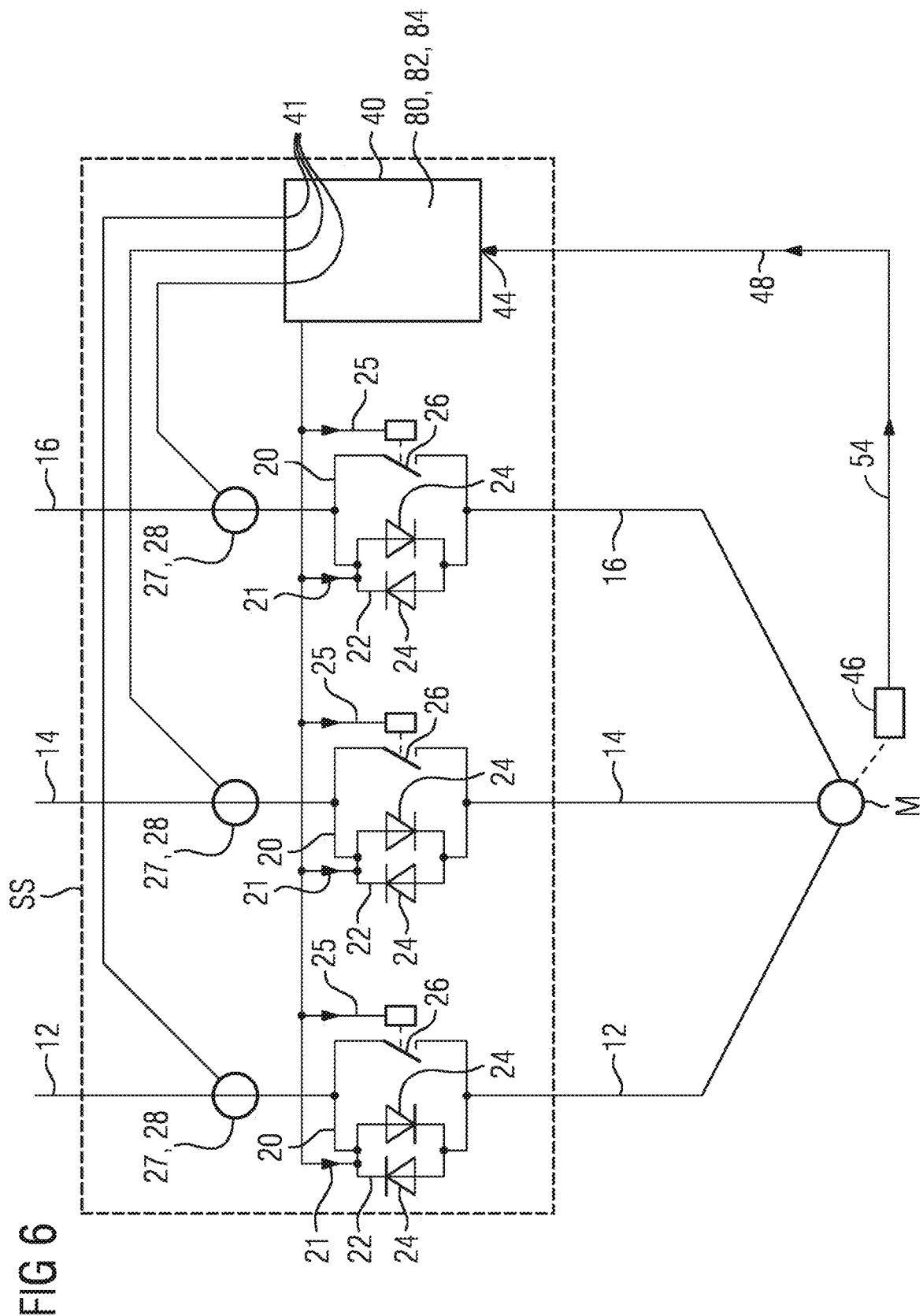
FIG. 6 shows a schematic illustration of a control apparatus.

FIG. 6 shows a soft starter SS, which is connected to three main current paths (phase conductors) 12, 14, 16 of an AC voltage supply having three phases U, V, W of the three-phase machine M. In the soft starter SS, a circuit 20, which in each case comprises a semiconductor switch 22 and an electromechanical bypass contact 26 for bypassing the semiconductor switch 22 during grid operation, is associated with each of the main current paths 12, 14, 16. The semiconductor switch 22 is in the form of a pair of thyristors arranged back-to-back in parallel. The electromechanical bypass contact 26 is in the form of a relay. Each of the semiconductor switches 22 and the electromechanical bypass contacts 26 is connected to a control apparatus 40, which controls the soft starter SS during operation.

The control apparatus 40 can be integrated in the housing of the soft starter SS or can be accommodated in a separate housing. The electromechanical bypass contacts 26 are closed during grid operation of the three-phase machine M, and the semiconductor switches 22 are open. The control apparatus 40 has a memory 82, in which a computer program product 80 is stored. The control apparatus 40 has an arithmetic and logic unit 84, for example a digital computer, processor or ASIC, which can execute the computer program product 80 stored in the memory 82. The computer program product 80 is designed, inter alia, to implement phase-gating control or phase-chopping control by way of the semiconductor switches 22.

In addition, a measurement device 27, which is in the form of a measuring transducer 28 and is designed to detect and/or measure a current flow IU,V,W in one of the main current paths 12, 14, 16, is associated with each main current path 12, 14, 16. Each of the measurement device 27 is coupled to the control apparatus 40 via a measurement signal input 41. The computer program product 80 in the control apparatus 40 is designed to receive and evaluate an operational variable detected by the measurement device 27, i.e., inter alia, the current flow IU,V,W in the main current paths 12, 14, 16.

Furthermore, the control apparatus 40 is provided with a sensor signal input 44, via which sensor signals 54 are received. The sensor signals 54 are generated by a tachometer 46, which is located in or on the three-phase machine M and detects the speed nm of the three-phase machine M.

The control apparatus 40 is designed to send first control signals 25 for initiating the switching-on of the electromechanical bypass contacts 26 to the electromechanical bypass contacts 26 and second control signals 21 in the form of firing pulses to the semiconductor switches 22.

The control apparatus 40 generates a first control signal 25, by which the switching-on of the mechanical bypass contacts 26 is initiated once a preset criterion during runup of the three-phase machine M using the soft starter SS has been reached, wherein the time of the generation of the first control signal 25 represents an actuation time of the bypass contacts 26. For this purpose, the control apparatus 40 is connected to the tachometer 46, which is arranged on the three-phase machine M, via a signal line 48, from which tachometer the control apparatus 40 receives speed values with the unit rpm, relating to the present speed nm of the three-phase machine M. The control apparatus 40 compares the received speed values with a target speed which is stored in the memory 82 of the control apparatus 40 and generates the first control signal 25 as soon as the speed nm of the three-phase machine M has reached the preset target speed. In this case, the transmission of the first control signals 25 from the control apparatus 40 to the mechanical bypass contacts 26 of the soft starter SS takes place via a control line.

The control apparatus additionally generates firing pulses for the thyristors 24 within a time period, which ranges from the actuation time to a contact time of the bypass contacts 26, by way of a second control signal 21, wherein a respective firing pulse for a thyristor 24 is generated when a phase current measurement reveals that the current IU,V,W in an associated phase U, V, W falls below a preset value. For this purpose, the control apparatus 40 is connected via a signal line to the measurement device 27 in the form of measuring transducers 28, from which the control apparatus 40 receives measured values relating to the present current intensity IU,V,W in a phase U, V, W. The control apparatus 40 compares the received phase current measured values current IU,V,W with a corresponding preset value which is stored in the memory 82 of the control apparatus 40 and generates the second control signal 21 when the current in the associated phase U, V, W falls below a preset value. In this case, the transmission of the second control signal 21 from the control apparatus 40 to the semiconductor switches 22 of the soft starter SS takes place via a control line.

Additionally the control apparatus 40 operates the three-phase machine M during grid operation via the electromechanical bypass contacts 26. In this case, the transmission of the control signals from the control apparatus 40 to the bypass contacts 26 of the soft starter SS takes place via a control line.

LIST OF REFERENCE SYMBOLS 12 first main current path, phase conductor
14 second main current path, phase conductor
16 third main current path, phase conductor
20 circuit
21 second control signal, firing command
22 semiconductor switch
24 thyristor
25 first control signal
26 electromechanical bypass contact
27 measurement device
28 measuring transducer
40 control apparatus
41 measurement signal input
44 sensor signal input
46 tachometer
48 signal line
54 sensor signal
80 program
82 memory
84 arithmetic and logic unit
G encoder
$I_{U,V,W}$ phase current
L rotor
M three-phase machine
N north pole
$n_m$ speed
S south pole
SS soft starter
St stator
S1 Step 1
S2 Step 2

S3 Step 3
t time
U phase, winding phase
V phase, winding phase
W phase, winding phase

The invention claimed is:

1. A method for grid synchronization of a permanent-magnet three-phase machine including a soft starter, the soft starter including thyristors, and mechanical bypass contacts for bypassing the thyristors during grid operation, the method comprising:
generating a first control signal, the switching-on of the mechanical bypass contacts being initiated by the first control signal once a criterion has been reached during runup of the permanent-magnet three-phase machine using the soft starter, a time of generation of the first control signal representing an actuation time of the mechanical bypass contacts;
generating, via a second control signal, firing pulses for the thyristors within a time period, the time period ranging from the actuation time to a contact time of the mechanical bypass contacts; and
operating the permanent-magnet three-phase machine during grid operation via the mechanical bypass contacts, wherein a respective firing pulse for a respective thyristor, of the thyristors, is generated upon a phase current measurement revealing that a current intensity in an associated phase falls below a threshold value.

2. The method of claim 1, wherein reaching of the criterion includes a speed of the permanent-magnet three-phase machine reaching a target speed for the permanent-magnet three-phase machine in a speed corridor.

3. The method of claim 2, wherein the target speed is higher or lower than a grid speed.

4. The method of claim 2, wherein the contact time is a time, determined using measurement technology, at which the mechanical bypass contacts are on.

5. The method of claim 2, wherein the contact time is a time period, determined by tests, since the actuation time, plus a safety margin.

6. A non-transitory computer program product, directly loadable onto an internal memory of a digital computer and including software code segments to, when executed when the non-transitory computer program product is running on the digital computer, execute the method of claim 2.

7. The method of claim 1, wherein the criterion includes a differential angle, resulting from a difference between a grid angle and a rotor angle, lying in a differential angle corridor.

8. The method of claim 7, wherein at least one of a respective speed corridor and differential angle corridor is learned during a respective one of operation of the permanent-magnet three-phase machine and during a multiplicity of runups.

9. The method of claim 1, wherein the criterion includes an absolute value of a total flux, resulting from an addition of a flux generated by permanent magnets of the permanent-magnet three-phase machine and a flux generated by a damper cage, exceeding a minimum flux value, and wherein the absolute value of the total flux is determined from measured motor voltages.

10. The method of claim 1, wherein the contact time is a time, determined using measurement technology, at which the mechanical bypass contacts are on.

11. The method of claim 1, wherein, the contact time is a time period, determined by tests, since the actuation time, plus a safety margin.

12. A non-transitory computer program product, directly loadable onto an internal memory of a digital computer and including software code segments to, when executed when the non-transitory computer program product is running on the digital computer, execute the method of claim 1.

13. A control apparatus for a three-phase machine including a soft starter including thyristors, and including mechanical bypass contacts for bypassing the thyristors during grid operation, the control apparatus being configured to implement at least:
generating a first control signal, the switching-on of the mechanical bypass contacts being initiated by the first control signal once a criterion has been reached during runup of the three-phase machine using the soft starter, a time of generation of the first control signal representing an actuation time of the mechanical bypass contacts;
generating, via a second control signal, firing pulses for the thyristors within a time period, the time period ranging from the actuation time to a contact time of the mechanical bypass contacts; and
operating the three-phase machine during grid operation via the mechanical bypass contacts, wherein a respective firing pulse for a respective thyristor, of the thyristors, is generated upon a phase current measurement revealing that a current intensity in an associated phase falls below a threshold value.

14. The control apparatus of claim 13, comprising
a sensor signal input for receiving a measured value of an operational variable of the three-phase machine;
a measurement signal input for receiving measured values of the current intensity from a phase current measurement in the associated phases;
a memory for storing a value for a comparison with the measured values of the current intensity; and
an arithmetic and logic unit for establishing, based upon the measured value of the operational variable, whether the criterion has been reached during runup of the three-phase machine, for establishing, based upon the measured values of the current intensity, whether the current intensity in an associated phase falls below the value, and for generating the first control signal and the second control signal.

15. A three-phase machine comprising:
a soft starter including thyristors;
mechanical bypass contacts for bypassing the thyristors during grid operation; and
the control apparatus of claim 13 for control of the three-phase machine.

16. A three-phase machine comprising:
a soft starter including thyristors;
mechanical bypass contacts for bypassing the thyristors during grid operation; and
the control apparatus of claim 14, for control of the three-phase machine.

* * * * *